United States Patent
Trika et al.

(10) Patent No.: US 9,870,462 B2
(45) Date of Patent: Jan. 16, 2018

(54) PREVENTION OF CABLE-SWAP SECURITY ATTACK ON STORAGE DEVICES

(71) Applicant: Intel Corporation, Santa Clara, CA (US)

(72) Inventors: Sanjeev N. Trika, Portland, OR (US); Jason Cox, Longmont, CO (US); Anand S. Ramalingam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 93 days.

(21) Appl. No.: 14/492,168

(22) Filed: Sep. 22, 2014

(65) Prior Publication Data
US 2016/0085959 A1 Mar. 24, 2016

(51) Int. Cl.
*G06F 21/44* (2013.01)
*H04L 9/32* (2006.01)
*G06F 21/31* (2013.01)

(52) U.S. Cl.
CPC .............. *G06F 21/44* (2013.01); *G06F 21/31* (2013.01); *H04L 9/3271* (2013.01)

(58) Field of Classification Search
CPC .......... G06F 11/16; G06F 12/14; G06F 21/31; G06F 21/44; G06F 21/78; G06F 21/85; G06F 2221/2103; H04L 9/00; H04L 9/06; H04L 9/14; H04L 9/32; H04L 9/3271
USPC .................. 726/7, 34–36; 713/193
See application file for complete search history.

(56) References Cited

U.S. PATENT DOCUMENTS

| | | | | |
|---|---|---|---|---|
| 5,987,419 A | * | 11/1999 | Hachino | G06F 11/00 340/3.44 |
| 6,026,492 A | * | 2/2000 | Cromer | G06F 21/88 340/568.1 |
| 6,105,136 A | * | 8/2000 | Cromer | G06F 21/78 709/218 |

(Continued)

FOREIGN PATENT DOCUMENTS

| | | | | |
|---|---|---|---|---|
| CA | 2900829 A1 | * | 10/2015 | |
| DE | WO 2014114476 A1 | * | 7/2014 | ......... H04L 63/0838 |
| WO | 2013006819 A1 | | 1/2013 | |

OTHER PUBLICATIONS

Riboni, "Obfuscation of Sensitive Data in Network Flows", 2012 Proceedins IEEE INFOCOM, 2012, pp. 2372-2380.*

(Continued)

*Primary Examiner* — Luu Pham
*Assistant Examiner* — Walter Malinowski
(74) *Attorney, Agent, or Firm* — Grossman, Tucker, Perreault & Pfleger, PLLC (57) ABSTRACT

Generally, this disclosure provides systems, devices, methods and computer readable media for prevention of cable swap security attacks on storage devices. A host system may include a provisioning module configured to generate a challenge-response verification key-pair and further to provide the key-pair to the storage device to enable the challenge-response verification. The system may also include a link error detection module to detect a link error between the host system and the storage device. The system may further include a challenge-response protocol module configured to initiate, in response to the link-error detection, a verification challenge from the storage system and to provide a response to the verification challenge based on the key-pair.

19 Claims, 7 Drawing Sheets

(56) References Cited

U.S. PATENT DOCUMENTS

| | | | | |
|---|---|---|---|---|
| 6,195,752 | B1* | 2/2001 | Pfab | G06F 12/1408 380/255 |
| 6,363,148 | B1* | 3/2002 | Sako | H04L 63/0428 380/28 |
| 6,516,442 | B1* | 2/2003 | Wang | G06F 12/0813 711/146 |
| 6,816,993 | B1* | 11/2004 | Furuyama | H04L 1/1835 386/E5.002 |
| 7,650,645 | B1* | 1/2010 | Langendorf | G06F 21/606 713/182 |
| 2001/0025342 | A1* | 9/2001 | Uchida | H04L 9/3231 713/186 |
| 2002/0067829 | A1* | 6/2002 | Ficco | H04N 5/913 380/210 |
| 2003/0216143 | A1* | 11/2003 | Roese | G01S 5/02 455/456.1 |
| 2004/0054840 | A1* | 3/2004 | Berg | G06F 3/0622 710/306 |
| 2004/0187029 | A1* | 9/2004 | Ting | G06F 21/32 726/5 |
| 2005/0057341 | A1* | 3/2005 | Roesner | G06K 19/0723 340/10.33 |
| 2005/0069128 | A1* | 3/2005 | Inoue | G06F 21/10 380/42 |
| 2005/0192099 | A1* | 9/2005 | Nguyen | G06F 21/10 463/42 |
| 2006/0074807 | A1* | 4/2006 | Gauba | G11B 27/105 705/51 |
| 2006/0080737 | A1* | 4/2006 | Freeman | G06F 21/562 726/24 |
| 2006/0130316 | A1* | 6/2006 | Takase | G11B 5/40 29/603.09 |
| 2008/0037785 | A1* | 2/2008 | Gantman | H04L 9/0872 380/259 |
| 2008/0052539 | A1* | 2/2008 | MacMillan | G06F 21/78 713/193 |
| 2008/0059661 | A1* | 3/2008 | Akahane | G06F 13/4081 710/18 |
| 2008/0265915 | A1* | 10/2008 | Clark | G01R 27/04 324/699 |
| 2008/0301466 | A1* | 12/2008 | Hsu | G06F 8/65 713/189 |
| 2009/0009283 | A1* | 1/2009 | Arts | G08B 13/1418 340/5.2 |
| 2009/0049240 | A1* | 2/2009 | Oe | G06F 11/2074 711/114 |
| 2009/0138727 | A1* | 5/2009 | Campello de Souza | G06F 21/80 713/193 |
| 2010/0083388 | A1* | 4/2010 | Murayama | H04L 12/12 726/36 |
| 2010/0131789 | A1* | 5/2010 | Kimura | G06F 11/1441 713/323 |
| 2010/0266128 | A1* | 10/2010 | Asokan | H04L 63/0853 380/278 |
| 2011/0022839 | A1* | 1/2011 | Hair | H04L 63/0442 713/165 |
| 2011/0051854 | A1* | 3/2011 | Kizer | H04L 25/4919 375/340 |
| 2011/0058420 | A1* | 3/2011 | Yamada | G11C 8/18 365/185.09 |
| 2011/0225478 | A1* | 9/2011 | Kimura | H04L 1/0061 714/799 |
| 2012/0079288 | A1* | 3/2012 | Hars | G06F 21/00 713/193 |
| 2012/0170731 | A1* | 7/2012 | Smith | H04L 63/102 379/142.05 |
| 2012/0278579 | A1* | 11/2012 | Goss | G06F 12/0246 711/166 |
| 2012/0297207 | A1* | 11/2012 | Carlsen | G06F 13/4081 713/300 |
| 2013/0010963 | A1* | 1/2013 | Farrugia | H04L 9/002 380/277 |
| 2013/0018979 | A1* | 1/2013 | Cohen | H04L 67/125 709/217 |
| 2013/0019072 | A1* | 1/2013 | Strasser | G06F 11/1044 711/154 |
| 2013/0080829 | A1* | 3/2013 | Colline | G06F 11/0727 714/6.22 |
| 2013/0086390 | A1* | 4/2013 | Kennedy | G06F 21/62 713/189 |
| 2013/0091564 | A1* | 4/2013 | Fitzgerald | G06F 21/88 726/17 |
| 2013/0286864 | A1* | 10/2013 | Karam | H04L 41/5067 370/252 |
| 2013/0290396 | A1* | 10/2013 | Hohnke | G06F 9/441 709/201 |
| 2014/0012641 | A1* | 1/2014 | Birch | G09F 9/30 705/14.4 |
| 2014/0032933 | A1* | 1/2014 | Smith | G06F 21/6209 713/193 |
| 2014/0059350 | A1* | 2/2014 | Unagami | B60L 11/1846 713/169 |
| 2014/0108786 | A1* | 4/2014 | Kreft | G06F 21/71 713/156 |
| 2014/0281554 | A1* | 9/2014 | Maletsky | H04L 9/14 713/175 |
| 2015/0127930 | A1* | 5/2015 | Offenberg | G06F 21/572 713/2 |
| 2015/0249642 | A1* | 9/2015 | Burns | H04L 12/66 726/4 |
| 2015/0286409 | A1* | 10/2015 | Chandra | G06F 3/0604 711/170 |
| 2015/0358321 | A1* | 12/2015 | Udagawa | H04L 63/0442 713/176 |
| 2015/0371214 | A1* | 12/2015 | Schroder | H04L 63/0838 705/44 |
| 2016/0269363 | A1* | 9/2016 | Southerland | G05B 19/054 |

OTHER PUBLICATIONS

Kreibich, "Honeycomb—Creating Intrusion Detection Signatures Using Honeypots", CCR Paper Comment, Discussion, and Update Forum, ACM SIGCOMM Computer Communications Review, vol. 34, No. 1, Jan. 2004, pp. 51-56.*

Efstathiou, "Public Infrastructures for Internet Access in Metropolitan Areas", AccessNets'06, Sep. 4-6, 2006, 6 pages.*

"IEEE Standard for Information Technology: Hardcopy Device and System Security", IEEE Std 2600, 187 pages.*

International Search Report and Written Opinion received for PCT Application No. PCT/US2015/047644, dated Dec. 8, 2015, 14 pages.

Taiwanese Office Action and Search Report issued in corresponding Taiwanese Application No. 104125803, dated Jun. 27, 2016 and Search Report, with English translation.

Taiwanese Office Action and Search Report issued in Taiwanese Application No. 104125803, dated Jan. 23, 2017, with English translation of Search Report, 12 pages.

International Preliminary Report on Patentability issued in PCT Application No. PCT/US2015/047644, dated Apr. 6, 2017, 11 pages.

Taiwanese Office Action and Search Report issued in Taiwanese Application No. 104125803, dated Aug. 10, 2017, with English translation of the Search Report, 16 pages.

* cited by examiner

PREVENTION OF CABLE-SWAP SECURITY ATTACK ON STORAGE DEVICES

FIELD

The present disclosure relates to security of storage devices, and more particularly, to prevention of cable swap security attacks on storage devices.

BACKGROUND

Storage devices, such as hard disk drives (HDDs) and solid state drives (SSDs), typically provide some level of security for data stored on the media while the device is at rest (e.g., powered off). Depending on implementation and standard requirements, user and/or administrator passwords may be required to establish security keys to encrypt/decrypt the stored data. When the device powers up, a password may be required to unlock the device.

A problem with these techniques is that the devices (and the data) are susceptible to cable-swap attacks. In this type of attack, the data cable is removed from the device while maintaining power to the device. The device is then connected to the attacker's system, and the attacker is able to access (read and write) all data present on the drive without requiring any password knowledge. Since the device has not lost power during the attack, it remains unlocked and continues to process all reads and writes from the attacking system. One existing approach to handling this problem involves the use of additional encryption layers between the host and the storage device for all data reads and writes. However, this adds cost and complexity, requires additional power and reduces performance. Another existing approach involves the use of a specially designed device side connector that combines data and power. Unfortunately, this technique suffers from a relatively larger form factor and remains vulnerable to an attacker that can disassemble the connector casing to apply an alternate power source to the devices power pins and then proceed with the cable swap attack.

This type of cable swap attack is of growing concern as computer systems are expected to spend increased time in standby/connected-standby modes, and the storage devices associated with these systems remain unlocked during this period. Systems in these modes are susceptible to relatively easy theft, data extraction and data-wipes/replacements, since no password is required.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for prevention of cable swap security attacks on storage devices. In one embodiment, a host system may be coupled to a storage system by a data cable. Either or both of the host and storage systems may be configured to detect a link error in response to a disconnection of the data cable, a communication reset or similar disruptive event that may indicate a data cable swap even though power continues to be supplied to the storage system. The detected link error may then trigger a requirement for host verification/re-verification through a challenge-response protocol. The storage system may be configured to fail all read/write attempts from the host until a successful verification occurs. The challenge-response protocol may be based on a key-pair that is provided during an initial provisioning of the storage system. The key-pair may be a public/private encryption key pair or may be based on a shared secret.

Thus, in some embodiments, host verification, through a challenge-response protocol, may be required whenever a data cable swap is suspected while the storage system remains powered up. This verification may be performed in addition to the user authentication that is normally required after a power cycle of the storage system.

Figure 1:
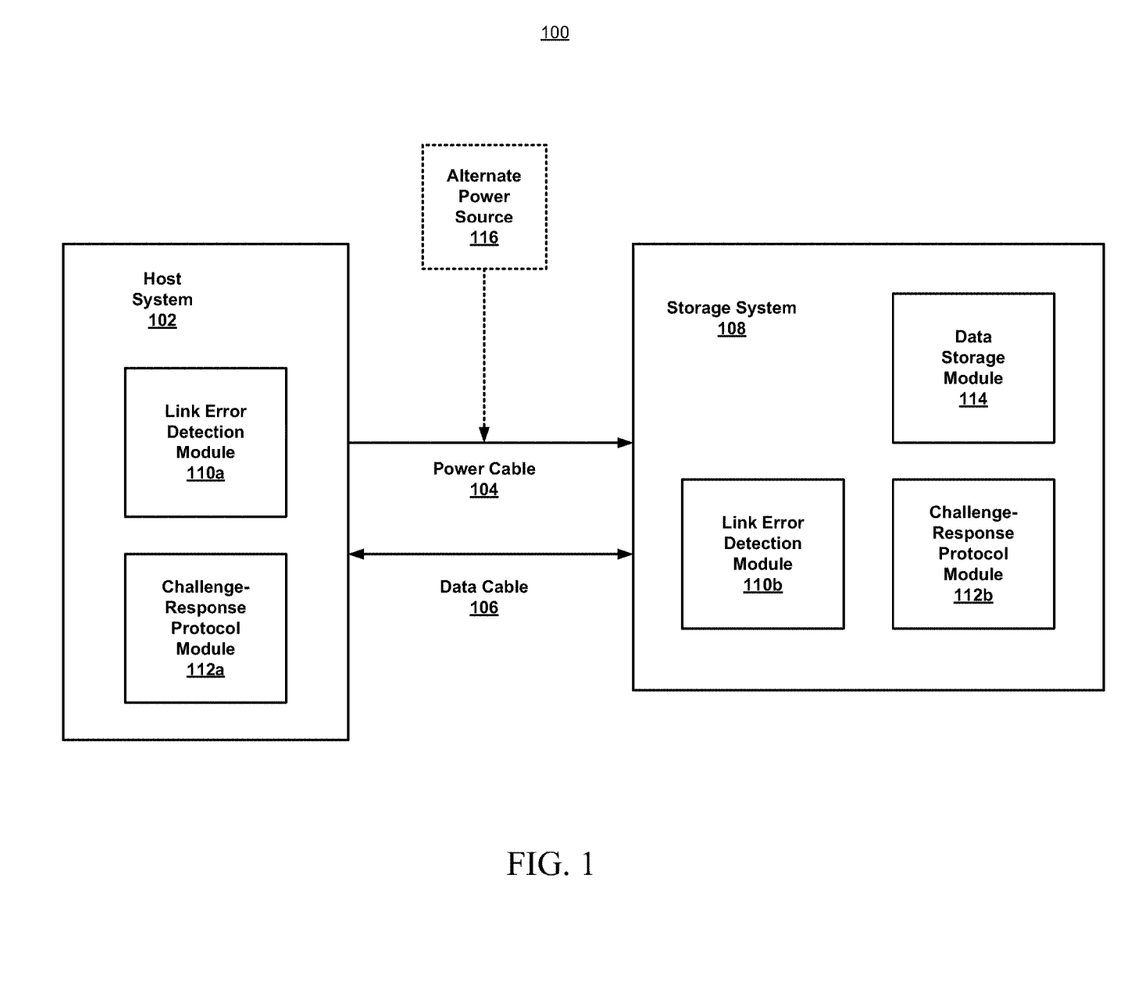
FIG. 1 illustrates a top level system diagram of an example embodiment consistent with the present disclosure.

FIG. 1 illustrates a top level system diagram 100 of one example embodiment consistent with the present disclosure. The host system 102 is shown to include a link error detection module 110a and a challenge-response protocol handling module 112a. Storage system 108 is shown to include a data storage module 114, a link error detection module 110b and a challenge-response protocol handling module 112b. In some embodiments, data storage module 114 may be a hard disk drive (HDD), a solid state drive (SSD), a combination of the two, or any other suitable data storage mechanism. Storage system 108 may be coupled to host system 102 through data cable 106. In some embodiments, data cable 106 may be a Serial Advanced Technology Attachment (SATA) cable, a Non-Volatile Memory Express (NVMe) cable or a Serial Attached Small Computer System Interface (SAS) cable. NVMe may be implemented as a Peripheral Component Interconnect Express (PCIe) link management protocol. Storage system 108 may receive power though power cable 104, which may provide power from system 102 or, in some embodiments, from an alternative power source 116.

Link error detection modules 110a, 110b may be configured, on the host system and storage system sides respectively, to detect a disconnection of the data cable 106. Challenge-response protocol handling modules 112a, 112b may be configured to verify the host system 102 after reconnection (indicating a possible swap of the data cable), as will be described in greater detail below.

Figure 2:
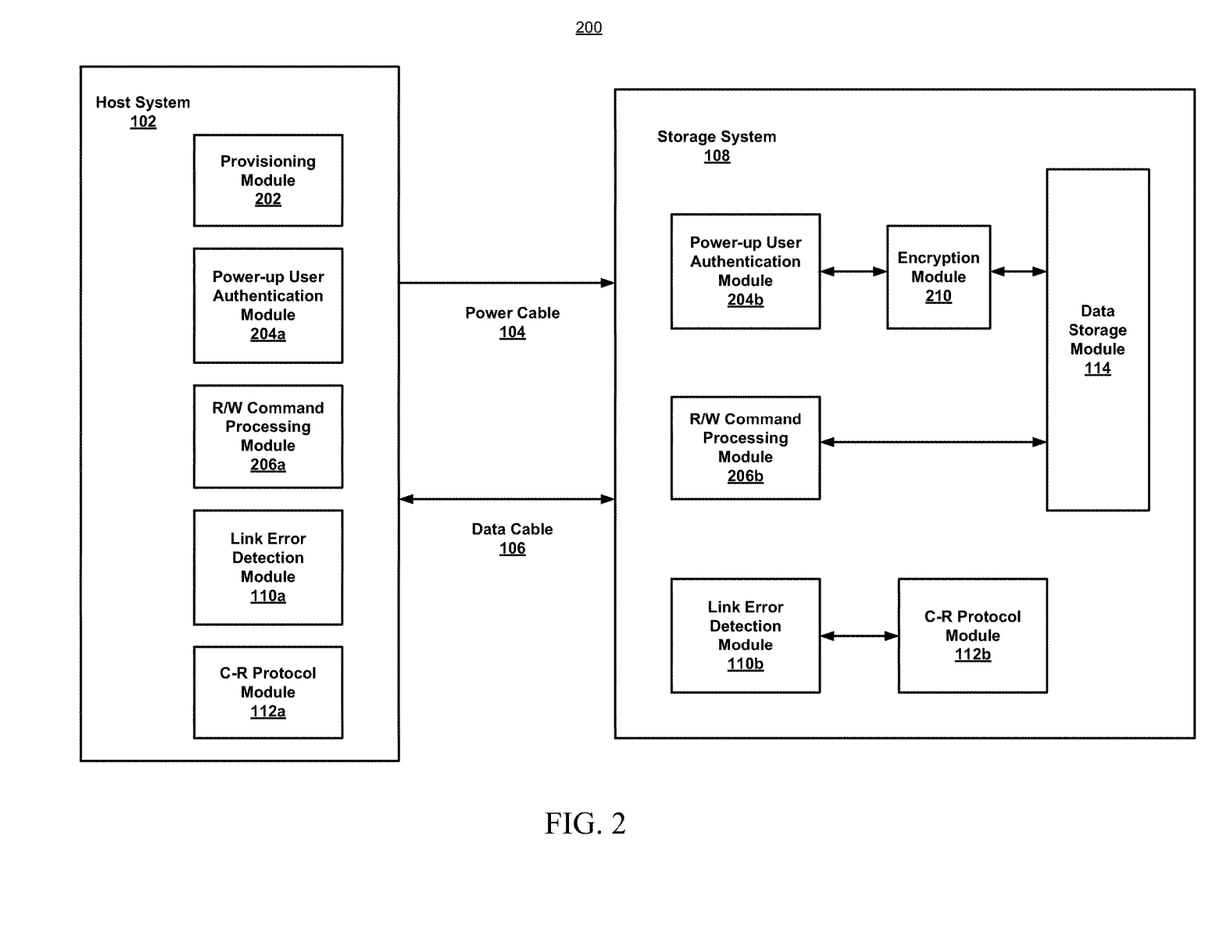
FIG. 2 illustrates a block diagram of one example embodiment consistent with the present disclosure.

FIG. 2 illustrates a block diagram 200 of one example embodiment consistent with the present disclosure. The host system 102 is shown to include a provisioning module 202, a power-up user authentication module 204a and a read/write command processing module 206a, in addition to the link error detection module 110a and challenge-response protocol handling module 112a. Storage system 108 is shown to include a power-up user authentication module 204b, a read/write command processing module 206b and an encryption module 210, in addition to the link error detection module 110b, challenge-response protocol module 112b and data storage module 114.

Provisioning module 202 may be configured to generate a suitable key-pair for use during the challenge-response protocol described below. In some embodiments, the key-pair may be made available to both the host system 102 and the storage system 108 during an initial coupling or system configuration, for example by the manufacturer or some other trusted system configuration entity. The key-pair may be a public/private encryption key pair that allows only the host and storage system to correctly exchange challenge and response data for verification purposes, or the key-pair maybe based on a shared secret.

Whenever the storage system 108 is powered up, for example after a power interruption or during a normal start up, the host system 102 may be authenticated using any suitable technique including a standard user/password verification procedure. Power-up user authentication modules 204a, 204b may be configured to perform this authentication on the host system and storage system sides respectively.

Encryption module 210 may be configured to encrypt the data stored on data storage module 114 such that the data is protected or locked until the power-up user authentication is successfully accomplished, after which the data may be unlocked or made readily available to the host system 102 for normal runtime operations. Read/write command processing module 206a may be configured to generate read and write requests on the host system 102 for transmission to the storage system 108 in order to read or write data to/from the data storage module 114. Likewise, read/write command processing module 206b may be configured to handle these requests on the storage system side.

Because a cable swap attack involves removal of the data cable from the storage system while the storage system remains powered, a link error or communications reset will be generated and can be detected by both the host system 102 and the storage system 108, for example by modules 110a and 110b respectively. When a link error is detected, the host system 102 and storage system 108 may operate collaboratively by executing a challenge-response protocol to verify or authenticate the host. Challenge-response protocol handling module 112a may be configured to execute portions of this protocol on the host system side and challenge-response protocol handling module 112b may be configured to execute portions of this protocol on the storage system side. Until verification of the host is accomplished, through execution of this protocol, the storage system may be configured to fail on all read and write attempts made by the host system. For example, read/write command processing module 206b may generate these failure conditions.

In some embodiments, execution of the challenge-response protocol may proceed as follows. The host system 102, after detecting a link error, may issue a request to storage system 108 to initiate the challenge-response protocol. In response to that request, the storage system 108 may generate a new challenge, for example a random challenge based on the key-pair provided during provisioning of the system, and transmit that challenge to the host system. The host system 102 may then generate a correct response to the challenge, also based on the key-pair, and transmit this response to the storage system 108. The storage system may then verify that the response is correct, and if so, resume processing of read/write operations. If the response is not correct, the storage system (e.g., read/write command processing module 206b) may continue to generate failures on all read/write operations and wait for any subsequent challenge-response protocol initiation requests from the host system 102.

Figure 3:
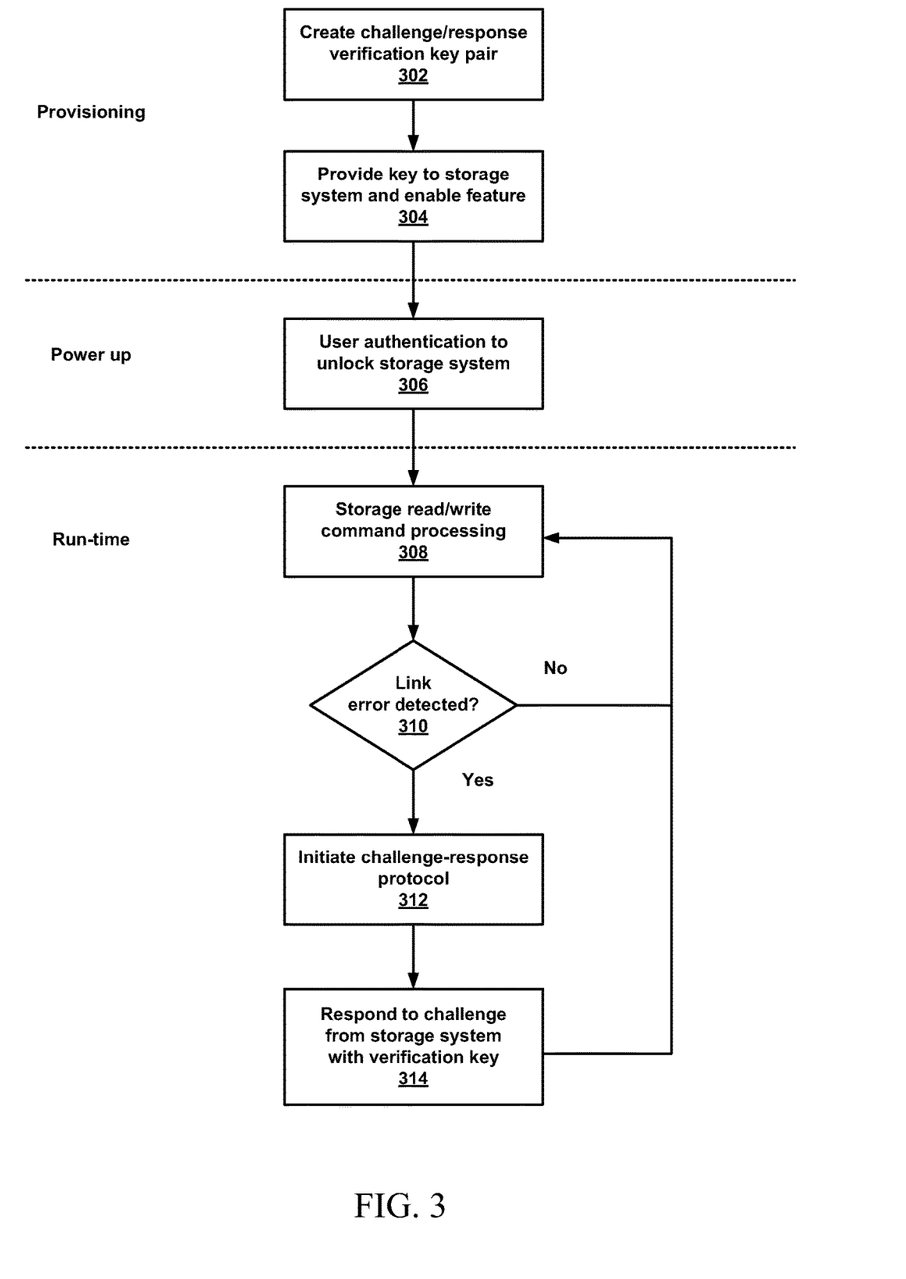
FIG. 3 illustrates a flowchart of operations of one example embodiment consistent with the present disclosure.

FIG. 3 illustrates a flowchart of operations 300 of one example embodiment consistent with the present disclosure. The operations provide a method for a host system, for example host system 102, to prevent cable swap security attacks on a storage device. Operations 302 and 304 may be part of a provisioning operation which may be performed during an initial coupling or system configuration, for example by the manufacturer or some other trusted system configuration entity. At operation 302, a challenge-response verification key-pair is created. At operation 304 the key is provided to the storage system to enable the challenge-response verification feature. At operation 306, a user authentication is performed to unlock the storage system, for example at power up. The user authentication may include transmitting a user identification/password to the storage system.

Operations 308 through 314 may be performed during run-time (e.g., after power up). At operation 308, storage read/write command processing may be performed to format, translate and/or transmit data access requests, from a user of the host system, to the storage system.

At operation 310, a link error detection check is performed. The method for detection of a link error, indicating for example the removal or disconnection of the data cable, may depend on the signaling protocol associated with the data cable and/or storage device. In the case of an SATA connection, for example, the link error may be associated with any of the following signals: COMRESET, COMINIT and/or COMWAKE, any of which may also generate a link-down interrupt on the host system. In the case of an SAS connection, the link error may be associated with any of the following signals: COMSAS, COMRESET, COMINIT and/or COMWAKE, any of which may also generate a link-down interrupt on the host system. In the case of an NVMe connection, the link error may be associated with a PCIe reset and a link-down interrupt on the host system. It will be appreciated that other types of cabling and signaling protocols may be used along with any suitable link error detection mechanism.

If a link error has not been detected then storage read/write command processing may continue. If a link error has been detected, however, then the host system may initiate a challenge-response protocol at operation 312 by, for example, requesting a challenge from the storage system. At operation 314, the host system may respond to a challenge received from the storage system by providing a verification key to the storage system. Read/write command processing may then proceed, at operation 308. If the verification was not successful, for any reason, the read/write requests will fail and a new attempt may be made to initiate the challenge-response protocol.

Figure 4:
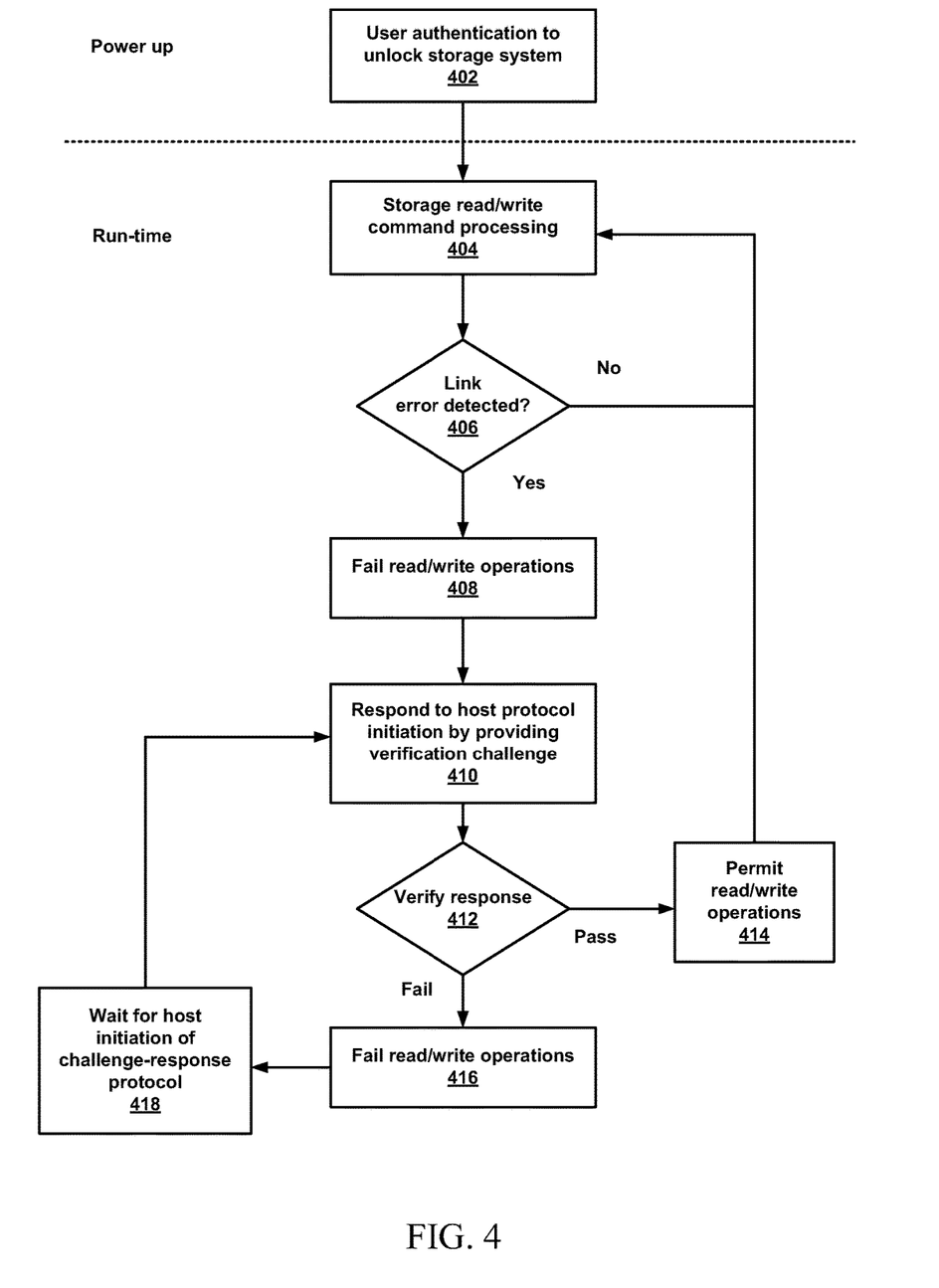
FIG. 4 illustrates a flowchart of operations of another example embodiment consistent with the present disclosure.

FIG. 4 illustrates a flowchart of operations 400 of another example embodiment consistent with the present disclosure. The operations provide a method for a storage system, for example storage system 108, to prevent cable swap security attacks. At operation 402, a user authentication is performed to unlock the storage system, for example at power up. The user authentication may include receiving a user identification/password from the storage system. Unlocking the storage system may include decryption of the stored data once the user identification is authenticated.

Operations 404 through 418 may then be performed during run-time (e.g., after power up). At operation 404, storage read/write commands, received from the host system, may be processed and the corresponding reads and writes to/from the data storage module may be performed. At operation 406, a link error detection check is performed. If a link error has not been detected then storage read/write command processing continues. If a link error has been detected, then at operation 408, the storage system will cause subsequent read/write operations to fail.

At operation 410, in response to receiving a challenge-response protocol initiation request from the host system, a verification challenge is provided to the host system. In some embodiments, the storage system may initiate the protocol, after detection of a link-error, without waiting for an initiation request. At operation 412, the response is received from the host system and verified. If the verification passes, then at operation 414, read/write operations will be permitted. If the verification fails, then at operation 416, read/write operations will continue to fail and, at operation 418, the storage system will wait for the host system to initiate or reinitiate the challenge-response protocol.

Figure 5:
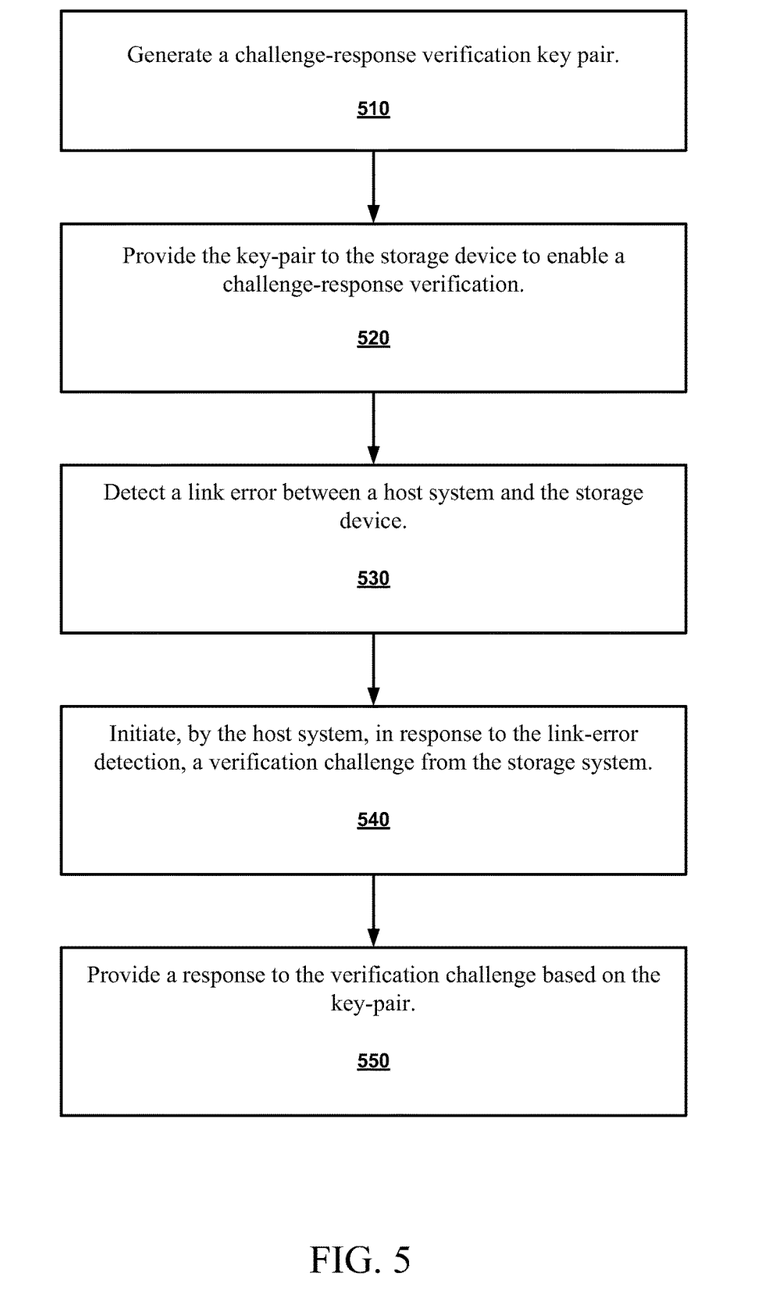
FIG. 5 illustrates a flowchart of operations of another example embodiment consistent with the present disclosure.

FIG. 5 illustrates a flowchart of operations 500 of another example embodiment consistent with the present disclosure. The operations provide a method for prevention of cable swap security attacks on a storage device. At operation 510, a challenge-response verification key-pair is generated by a host system coupled to the storage device. At operation 520, the key-pair is provided to the storage device to enable the challenge-response verification. At operation 530, a link error is detected between the host system and the storage device. At operation 540, in response to the link-error detection, the host system initiates a verification challenge from the storage system. At operation 550, a response to the verification challenge is provided. The response is based on the key-pair.

Figure 6:
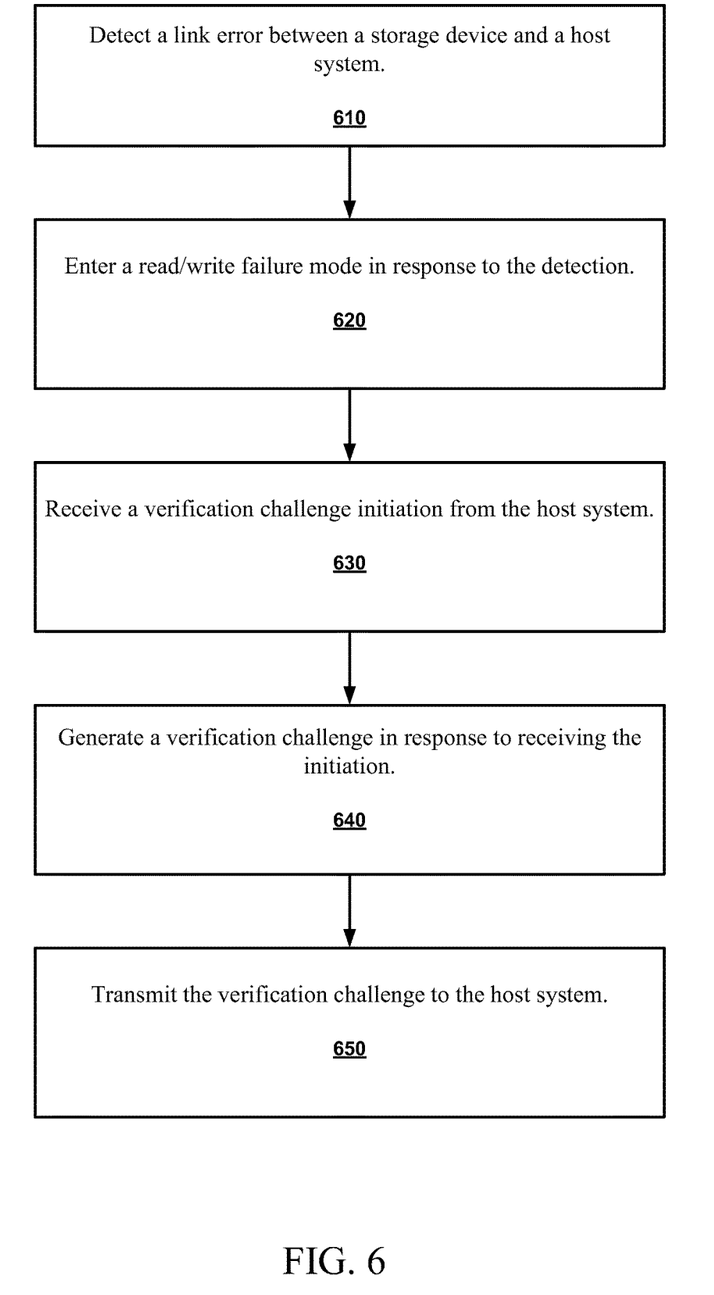
FIG. 6 illustrates a flowchart of operations of another example embodiment consistent with the present disclosure.

FIG. 6 illustrates a flowchart of operations 600 of another example embodiment consistent with the present disclosure. The operations provide a method for prevention of cable swap security attacks on a storage device. At operation 610, a link error between the storage device and a host system is detected. At operation 620, a read/write failure mode is entered in response to the detection. At operation 630, a verification challenge initiation is received from the host system. At operation 640, a verification challenge is generated in response to the receiving. At operation 650, the verification challenge is transmitted to the host system.

Figure 7:
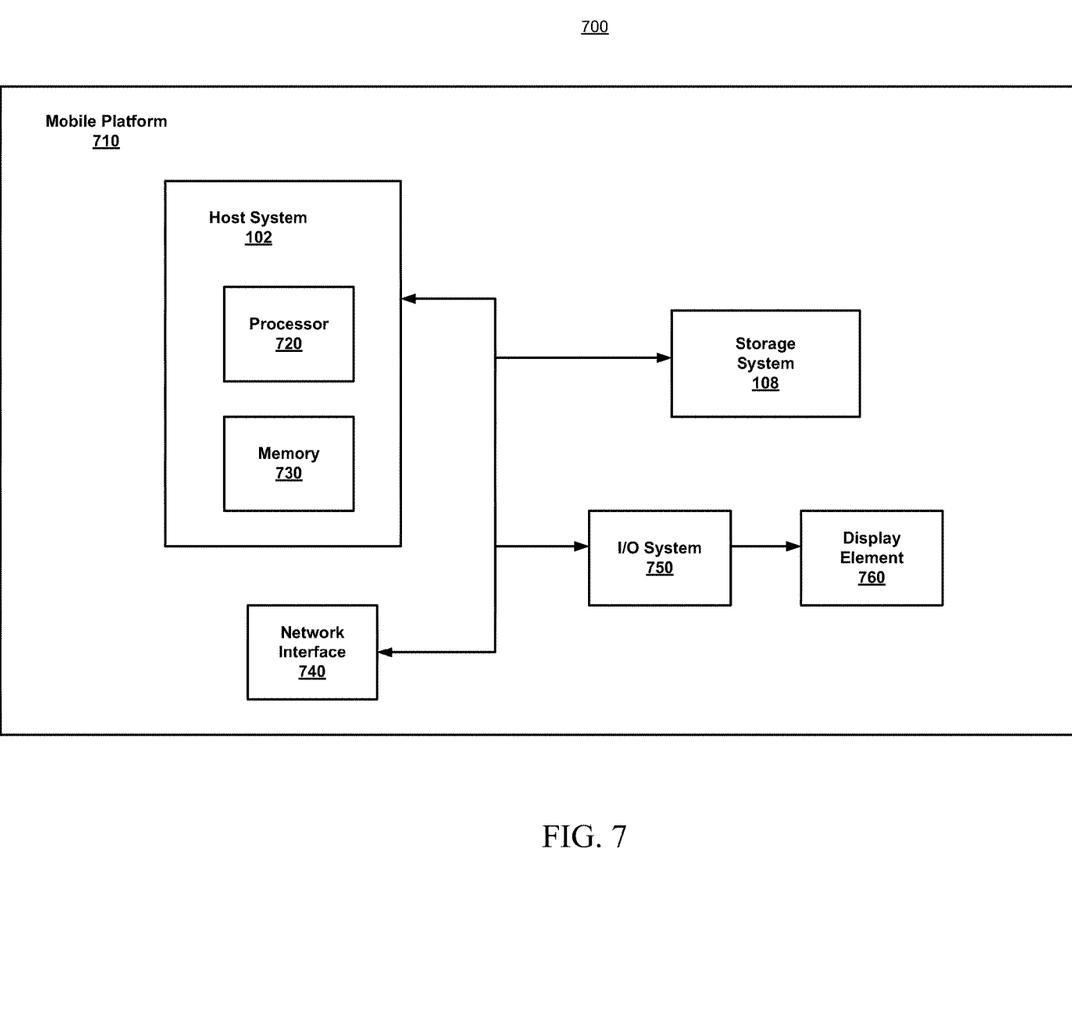
FIG. 7 illustrates a system diagram of a platform of another example embodiment consistent with the present disclosure.

FIG. 7 illustrates a system diagram 700 of one example embodiment consistent with the present disclosure. The system 700 may be a mobile platform 710 or computing device such as, for example, a smart phone, smart tablet, personal digital assistant (PDA), mobile Internet device (MID), convertible tablet, notebook or laptop computer, or any other suitable device. It will be appreciated, however, that embodiments of the system described herein are not limited to mobile platforms, and in some embodiments, the system 700 may be a workstation or desktop computer. The device may generally present various interfaces to a user via a display element 760 such as, for example, a touch screen, liquid crystal display (LCD) or any other suitable display type.

The system 700 is shown to include a host system 102 that may further include any number of processors 720 and memory 730. In some embodiments, the processors 720 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. The memory 730 may be coupled to the processors. The memory 730 may be any of a wide variety of memories (including various layers of memory hierarchy and/or memory caches) as are known or otherwise available to those of skill in the art. It will be appreciated that the processors and memory may be configured to store, host and/or execute one or more user applications or other software modules. These applications may include, but not be limited to, for example, any type of computation, communication, data management, data storage and/or user interface task. In some embodiments, these applications may employ or interact with any other components of the mobile platform 710.

System 700 is also shown to include network interface module 740 which may include wireless communication capabilities, such as, for example, cellular communications, Wireless Fidelity (WiFi), Bluetooth®, and/or Near Field Communication (NFC). The wireless communications may conform to or otherwise be compatible with any existing or yet to be developed communication standards including past, current and future version of Bluetooth®, Wi-Fi and mobile phone communication standards.

System 700 is also shown to include an input/output (IO) system or controller 750 which may be configured to enable or manage data communication between processor 720 and other elements of system 700 or other elements (not shown) external to system 700.

System 700 is also shown to include a secure storage system 108, for example an HDD or SSD, coupled to the host system 102 and configured to prevent cable swap security attacks as described previously.

It will be appreciated that in some embodiments, the various components of the system 700 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as, for example, processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for prevention of cable swap security attacks on storage devices. The following examples pertain to further embodiments.

According to Example 1 there is provided a host system for securing a storage device. The host system may include a provisioning module to generate a challenge-response verification key-pair and further to provide the key-pair to the storage device to enable the challenge-response verification. The host system of this example may also include a link error detection module to detect a link error between the host system and the storage device. The host system of this example may further include a challenge-response protocol module to initiate, in response to the link-error detection, a verification challenge from the storage system and further to provide a response to the verification challenge based on the key-pair.

Example 2 may include the subject matter of Example 1, and the detected link error is associated with a communication reset of a data cable coupled between the host system and the storage device.

Example 3 may include the subject matter of any of Examples 1 and 2, and the detected link error is associated with a disconnect of a data cable coupled between the host system and the storage device.

Example 4 may include the subject matter of any of Examples 1-3, and the detected link error occurs during a standby-connected mode of the storage device.

Example 5 may include the subject matter of any of Examples 1-4, further including a power-up user authentication module to provide an authentication password to the storage device to unlock the storage device.

Example 6 may include the subject matter of any of Examples 1-5, and the storage device is a hard disk drive (HDD) or a solid state drive (SSD).

According to Example 7 there is provided a storage device. The storage device may include a data storage module to store data for access by a host system coupled to the storage device. The storage device of this example may also include a link error detection module to detect a link error between the storage device and the host system and further, in response to the detection, to cause the storage device to enter a read/write failure mode. The storage device of this example may further include a challenge-response protocol module to, in response to a verification challenge initiation received from the host system, generate a verification challenge and transmit the verification challenge to the host system.

Example 8 may include the subject matter of Example 7, and the challenge-response protocol module is further to verify a challenge-response received from the host system.

Example 9 may include the subject matter of Examples 7 and 8 and the challenge-response protocol module is further to cause the storage device to exit the read/write failure mode if the verification is successful.

Example 10 may include the subject matter of Examples 7-9, and the challenge-response protocol module is further to wait for a second verification challenge initiation received from the host system if the verification is unsuccessful.

Example 11 may include the subject matter of Examples 7-10, and the read/write failure mode is associated with a denial of access to the data storage module by the host system.

Example 12 may include the subject matter of Examples 7-11, further including a power-up user authentication module to verify an authentication password received from the host system and further to unlock the data storage module in response to success of the verification.

Example 13 may include the subject matter of Examples 7-12, and the detected link error is associated with a communication reset of a data cable coupled between the host system and the storage device.

Example 14 may include the subject matter of Examples 7-13, and the detected link error is associated with a disconnect of a data cable coupled between the host system and the storage device.

Example 15 may include the subject matter of Examples 7-14, and the detected link error occurs during a standby-connected mode of the storage device.

Example 16 may include the subject matter of Examples 7-15, further including an encryption module to lock and unlock the data storage module.

Example 17 may include the subject matter of Examples 7-16, and the storage device is a hard disk drive (HDD) or a solid state drive (SSD).

According to Example 18 there is provided at least one computer-readable storage medium having instructions stored thereon which when executed by a processor result in the following operations for securing a storage device. The operations may include generating a challenge-response verification key-pair; providing the key-pair to the storage device to enable the challenge-response verification; detecting a link error between a host system and the storage device; initiating, by the host system, in response to the link-error detection, a verification challenge from the storage system; and providing a response to the verification challenge based on the key-pair.

Example 19 may include the subject matter of Example 18, and the detected link error is associated with a communication reset of a data cable coupled between the host system and the storage device.

Example 20 may include the subject matter of Examples 18 and 19 and the detected link error is associated with a disconnect of a data cable coupled between the host system and the storage device.

Example 21 may include the subject matter of Examples 18-20 and the detected link error occurs during a standby-connected mode of the storage device.

Example 22 may include the subject matter of Examples 18-21 further including the operation of providing an authentication password to the storage device to unlock the storage device after a power-up of the storage device.

According to Example 23 there is provided at least one computer-readable storage medium having instructions stored thereon which when executed by a processor result in the following operations for securing a storage device. The operations may include detecting a link error between the storage device and a host system; entering a read/write failure mode in response to the detection; receiving a verification challenge initiation from the host system; generating a verification challenge in response to the receiving; and transmitting the verification challenge to the host system.

Example 24 may include the subject matter of Example 23, further including the operation of verifying a challenge-response received from the host system.

Example 25 may include the subject matter of Examples 23 and 24, further including the operation of exiting the read/write failure mode if the verification is successful.

Example 26 may include the subject matter of Examples 23-25, further including the operation of waiting for a second verification challenge initiation from the host system if the verification is unsuccessful.

Example 27 may include the subject matter of Examples 23-26, and the read/write failure mode is associated with a denial of access of the host system to data stored on the storage device.

Example 28 may include the subject matter of Examples 23-27, further including the operations of verifying an authentication password received from the host system and unlocking data stored on the storage device in response to success of the verification.

Example 29 may include the subject matter of Examples 23-28, and the detected link error is associated with a communication reset of a data cable coupled between the host system and the storage device.

Example 30 may include the subject matter of Examples 23-29, and the detected link error is associated with a disconnect of a data cable coupled between the host system and the storage device.

Example 31 may include the subject matter of Examples 23-30, and the detected link error occurs during a standby-connected mode of the storage device.

Example 32 may include the subject matter of Examples 23-31, further including the operations of encrypting the data stored on the storage device to lock the data and unencrypting the data to unlock the data.

According to Example 33 there is provided a method for securing a storage device. The method may include generating a challenge-response verification key-pair; providing the key-pair to the storage device to enable the challenge-response verification; detecting a link error between a host system and the storage device; initiating, by the host system, in response to the link-error detection, a verification challenge from the storage system; and providing a response to the verification challenge based on the key-pair.

Example 34 may include the subject matter of Example 33, and the detected link error is associated with a communication reset of a data cable coupled between the host system and the storage device.

Example 35 may include the subject matter of Examples 33 and 34, and the detected link error is associated with a disconnect of a data cable coupled between the host system and the storage device.

Example 36 may include the subject matter of Examples 33-35, and the detected link error occurs during a standby-connected mode of the storage device.

Example 37 may include the subject matter of Examples 33-36, further including providing an authentication password to the storage device to unlock the storage device after a power-up of the storage device.

According to Example 38 there is provided a method for securing a storage device. The method may include detecting a link error between the storage device and a host system; entering a read/write failure mode in response to the detection; receiving a verification challenge initiation from the host system; generating a verification challenge in response to the receiving; and transmitting the verification challenge to the host system.

Example 39 may include the subject matter of Example 38, further including verifying a challenge-response received from the host system.

Example 40 may include the subject matter of Examples 38 and 39, further including exiting the read/write failure mode if the verification is successful.

Example 41 may include the subject matter of Examples 38-40, further including waiting for a second verification challenge initiation from the host system if the verification is unsuccessful.

Example 42 may include the subject matter of Examples 38-41, and the read/write failure mode is associated with a denial of access of the host system to data stored on the storage device.

Example 43 may include the subject matter of Examples 38-42, further including verifying an authentication password received from the host system and unlocking data stored on the storage device in response to success of the verification.

Example 44 may include the subject matter of Examples 38-43, and the detected link error is associated with a communication reset of a data cable coupled between the host system and the storage device.

Example 45 may include the subject matter of Examples 38-44, and the detected link error is associated with a disconnect of a data cable coupled between the host system and the storage device.

Example 46 may include the subject matter of Examples 38-45, and the detected link error occurs during a standby-connected mode of the storage device.

Example 47 may include the subject matter of Examples 38-46, further including encrypting the data stored on the storage device to lock the data and unencrypting the data to unlock the data.

According to Example 48 there is provided a system for securing a storage device. The system may include means for generating a challenge-response verification key-pair; means for providing the key-pair to the storage device to enable the challenge-response verification; means for detecting a link error between a host system and the storage device; means for initiating, by the host system, in response to the link-error detection, a verification challenge from the storage system; and means for providing a response to the verification challenge based on the key-pair.

Example 49 may include the subject matter of Example 48, and the detected link error is associated with a communication reset of a data cable coupled between the host system and the storage device.

Example 50 may include the subject matter of Examples 48 and 49, and the detected link error is associated with a disconnect of a data cable coupled between the host system and the storage device.

Example 51 may include the subject matter of Examples 48-50, and the detected link error occurs during a standby-connected mode of the storage device.

Example 52 may include the subject matter of Examples 48-51, further including means for providing an authentication password to the storage device to unlock the storage device after a power-up of the storage device.

According to Example 53 there is provided a system for securing a storage device. The system may include means for detecting a link error between the storage device and a host system; means for entering a read/write failure mode in response to the detection; means for receiving a verification challenge initiation from the host system; means for generating a verification challenge in response to the receiving; and means for transmitting the verification challenge to the host system.

Example 54 may include the subject matter of Example 53, further including verifying a challenge-response received from the host system.

Example 55 may include the subject matter of Examples 53 and 54, further including means for exiting the read/write failure mode if the verification is successful.

Example 56 may include the subject matter of Examples 53-55, further including means for waiting for a second verification challenge initiation from the host system if the verification is unsuccessful.

Example 57 may include the subject matter of Examples 53-56, and the read/write failure mode is associated with a denial of access of the host system to data stored on the storage device.

Example 58 may include the subject matter of Examples 53-57, further including means for verifying an authentication password received from the host system and unlocking data stored on the storage device in response to success of the verification.

Example 59 may include the subject matter of Examples 53-58, and the detected link error is associated with a communication reset of a data cable coupled between the host system and the storage device.

Example 60 may include the subject matter of Examples 53-59, and the detected link error is associated with a disconnect of a data cable coupled between the host system and the storage device.

Example 61 may include the subject matter of Examples 53-60, and the detected link error occurs during a standby-connected mode of the storage device.

Example 62 may include the subject matter of Examples 53-61, further including means for encrypting the data stored on the storage device to lock the data and unencrypting the data to unlock the data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A host system in communication with a storage system, for securing a storage device disposed in said storage system, said host system comprising:

provisioning circuitry to generate a challenge-response verification public/private encryption key-pair and further to provide said key-pair to said storage device to enable said challenge-response verification;

power-up user authentication circuitry to provide an authentication password to said storage device to unlock said storage device;

link error detection circuitry, disposed in said storage system and in said host system, to detect a link error between said host system and said storage device occurring during a standby-connected mode of said storage device, wherein upon detection of said link error said link error detection circuitry in said storage system is to cause said storage system to generate failures on all read/write operations from said host system; and challenge-response protocol circuitry, disposed in said storage system and in said host system, to initiate, in response to said link-error detection, a verification challenge from said storage device and further to provide a response to said verification challenge based on said key-pair, wherein said verification challenge is to secure said storage device against a cable-swap attack and wherein a successful response to said verification challenge causes said link error detection circuitry in said storage system to discontinue generating said read/write failures.

2. The host system of claim 1, wherein said detected link error is associated with a communication reset of a data cable coupled between said host system and said storage device.

3. The host system of claim 1, wherein said detected link error is associated with a disconnect of a data cable coupled between said host system and said storage device.

4. The host system of claim 1, wherein said storage device is a hard disk drive (HDD) or a solid-state drive (SSD).

5. A storage device disposed in a storage system in communication with a host system, comprising:

data storage circuitry to store data for access by a host system coupled to said storage device;

power-up user authentication circuitry to verify an authentication password received from said host system and unlock said data storage circuitry in response to success of said verification;

link error detection circuitry, disposed in said storage system and in said host system, to detect a link error between said storage device and said host system occurring during a standby-connected mode of said storage device and further, in response to said link-error detection, to cause said storage device to generate failures on all read/write operations received from said host system while said storage device continues to receive power; and challenge-response protocol circuitry, disposed in said storage system and in said host system, to, in response to a verification challenge initiation received from said host system, generate a verification challenge and transmit said verification challenge to said host system, wherein said verification challenge is to secure said storage device against a cable-swap attack and wherein a successful response to said verification challenge causes said link error detection circuitry in said storage system to discontinue generating said read/write failures.

6. The storage device of claim 5, wherein said challenge-response protocol circuitry is further to verify a challenge-response received from said host system.

7. The storage device of claim 6, wherein said challenge-response protocol circuitry is further to wait for a second verification challenge initiation received from said host system if said verification is unsuccessful.

8. The storage device of claim 5, wherein said detected link error is associated with a communication reset of a data cable coupled between said host system and said storage device.

9. The storage device of claim 5, wherein said detected link error is associated with a disconnect of a data cable coupled between said host system and said storage device.

10. The storage device of claim 5, further comprising encryption circuitry to lock and unlock said data storage circuitry.

11. The storage device of claim 5, wherein said storage device is a hard disk drive (HDD) or a solid-state drive (SSD).

12. At least one non-transitory computer-readable storage medium, disposed in a storage system, said storage system in communication with a host system, wherein link error detection circuitry is disposed in said storage system and in said host system, and wherein challenge-response protocol circuitry is disposed in said in said storage system and in said host system, said at least one non-transitory computer readable storage medium having instructions stored thereon which when executed by a processor result in the following operations for securing a storage device, said operations comprising:

provyding an authentication password to said storage device to unlock said storage device after a power-up of said storage device;

generating a challenge-response verification public/private encryption key-pair;

providing said key-pair to said storage device to enable said challenge-response verification;

detecting a link error between a host system and said storage device occurring during a standby-connected mode of said storage device;

initiating, by said host system, in response to said link-error detection, a verification challenge from said storage device, wherein said verification challenge is to secure said storage device against a cable-swap attack by generating failures on all read/write operations from said host system until a successful response to said verification challenge is received; and providing a response to said verification challenge based on said key-pair.

13. The computer-readable storage medium of claim 12, wherein said detected link error is associated with a communication reset of a data cable coupled between said host system and said storage device.

14. The computer-readable storage medium of claim 12, wherein said detected link error is associated with a disconnect of a data cable coupled between said host system and said storage device.

15. At least one non-transitory computer-readable storage medium disposed in a storage system, said storage system in communication with a host system, wherein link error detection circuitry is disposed in said storage system and in said host system, and wherein challenge-response protocol circuitry is disposed in said storage system and in said host system, said at least one non-transitory computer-readable storage medium having instructions stored thereon which when executed by a processor result in the following operations for securing a storage device, said operations comprising:

verifying a challenge-response received from said host system;

upon success of said challenge-response verification, verifying an authentication password received from said host system;

upon success of said authentication password verification, unlocking data stored on said storage device in response to success of said verification;

detecting a link error between said storage device and a host system occurring during a standby-connected mode of said storage device;

generating failures on all read/write operations from said host system in response to said detection while said storage device continues to receive power;

receiving a verification challenge initiation from said host system;

generating a verification challenge in response to said receiving, wherein said verification challenge is to secure said storage device against a cable-swap attack and wherein a successful response to said verification challenge causes generation of said read/write failures to discontinue; and transmitting said verification challenge to said host system.

16. The computer-readable storage medium of claim 15, further comprising the operation of exiting said read/write failure mode if said verification is successful.

17. The computer-readable storage medium of claim 15, further comprising the operation of waiting for a second verification challenge initiation from said host system if said verification is unsuccessful.

18. The computer-readable storage medium of claim 15, wherein said detected link error is associated with a communication reset of a data cable coupled between said host system and said storage device.

19. The computer-readable storage medium of claim 15, wherein said detected link error is associated with a disconnect of a data cable coupled between said host system and said storage device.

* * * * *